(12) United States Patent
Ramachandran et al.

(10) Patent No.: US 7,693,181 B2
(45) Date of Patent: Apr. 6, 2010

(54) SYSTEMS AND METHODS OF SHARING INFORMATION BETWEEN PROTOCOL LAYERS

(75) Inventors: Umakishore Ramachandran, Lilburn, GA (US); Rajnish Kumar, Atlanta, GA (US); Charles Albert Reiss, Rehoboth, MA (US)

(73) Assignee: Georgia Tech Research Corporation, Atlanta, GA (US)

( * ) Notice: Subject to any disclaimer, the term of this patent is extended or adjusted under 35 U.S.C. 154(b) by 314 days.

(21) Appl. No.: 11/771,221

(22) Filed: Jun. 29, 2007

(65) Prior Publication Data

US 2008/0002740 A1 Jan. 3, 2008

Related U.S. Application Data

(60) Provisional application No. 60/817,489, filed on Jun. 29, 2006.

(51) Int. Cl.
*H04J 3/16* (2006.01)
(52) U.S. Cl. .................................... 370/469
(58) Field of Classification Search ................ None
See application file for complete search history.

(56) References Cited

U.S. PATENT DOCUMENTS

2006/0123048 A1* 6/2006 Larson ................. 707/103 R
2006/0239216 A1* 10/2006 Chen et al. ................. 370/310
2007/0147249 A1* 6/2007 Kumar ....................... 370/235
2007/0266134 A1* 11/2007 Shyy et al. .................. 709/223

* cited by examiner

*Primary Examiner*—Chirag G Shah
*Assistant Examiner*—Otis L Thompson, Jr.
(74) *Attorney, Agent, or Firm*—Thomas, Kayden, Horstemeyer & Risley, LLP; Todd Deveau

(57) ABSTRACT

An exemplary device comprises a first and second protocol layer, and an information exchange service (IES) in communication with the first and the second protocol layers. The IES is configured to share control information between the protocol layers. A protocol layer is capable of adapting behavior based on the control information shared by the IES. An exemplary method is presented for communicating between publishing and subscribing layers in a protocol stack. The method comprises, in the publishing layer, specifying a selected attribute and an associated value to be shared with the subscribing layer. The method further comprises storing the specified attribute and associated value, and receiving a subscribe request from the requesting layer. The request specifies the published attribute. The method further comprises, in response to the request, providing the associated value to a subscribing layer, and in the subscribing layer, adapting behavior based on the shared control information.

19 Claims, 5 Drawing Sheets

SYSTEMS AND METHODS OF SHARING INFORMATION BETWEEN PROTOCOL LAYERS

CROSS REFERENCE TO RELATED APPLICATIONS

This application claims the benefit of U.S. Provisional 60/817,489, filed Jun. 29, 2006, which is entirely incorporated by reference.

STATEMENT REGARDING FEDERALLY SPONSORED RESEARCH OR DEVELOPMENT

This invention was made with Government support under Agreement No. CCR-0121638, awarded by the National Science Foundation of the United States. The Government has certain rights in this invention.

FIELD OF THE INVENTION

The present invention relates to computer networks, and more specifically, to sharing information between protocol layers.

BACKGROUND

The explosive growth of the Internet has been spurred to a great extent by the modularity of the Internet protocol stack. The protocol stack used by the Internet follows the OSI model, which stresses stackability by requiring that layers interface with each other in very strict and limited ways. That is, sharing of information between layers is discouraged. This focus on stackability has enabled the independent development and validation of robust protocols. However, the lack of information in one layer about how another layer is operating can lead to non-optimal performance. This is particularly true in dynamic settings when network conditions can change quite dramatically. Thus, a need arises for these and other problems to be addressed.

SUMMARY

Systems and methods of sharing information between protocol layers are disclosed. An exemplary device comprises a first and second protocol layer, and an information exchange service (IES) in communication with the first and the second protocol layers. The IES is configured to share control information between the protocol layers. A protocol layer is capable of adapting behavior based on the control information shared by the IES.

An exemplary method is presented for communicating between publishing and subscribing layers in a protocol stack. The method comprises, in the publishing layer, specifying a selected attribute and an associated value to be shared with the subscribing layer. The method further comprises storing the specified attribute and associated value, and receiving a subscribe request from the requesting layer. The request specifies the published attribute. The method further comprises, in response to the request, providing the associated value to a subscribing layer, and in the subscribing layer, adapting behavior based on the shared control information.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
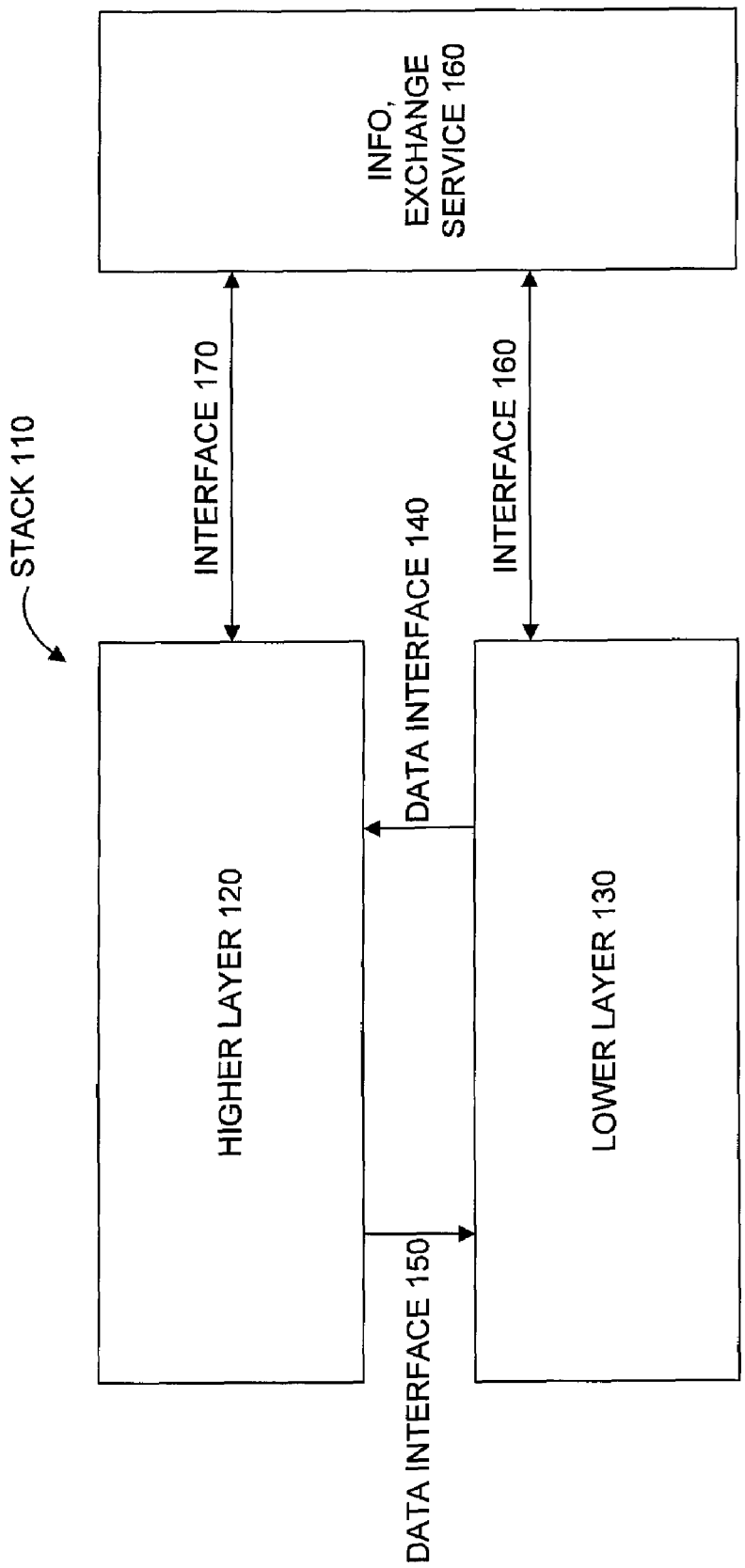
FIG. 1 is a block diagram of one embodiment of a system and method for sharing information between protocol layers.

FIG. 1 is a block diagram of one embodiment of a system and method for sharing information between protocol layers. A protocol stack 110 in a device includes an upper layer 120 and a lower layer 130, which pass packets through a data interface: packets received from another device are passed up the stack through data interface 140, while packets to be transmitted to another device are passed down the stack through data interface 150.

An information exchange service (IES) 160 communicates with upper layer 120 through interface 170, and with lower layer 130 through interface 180. IES 160 uses interfaces 170 and 180 to share control information between layers 120 and 130. Upper layer 120 uses control information originating from lower layer 130 and passed through interface 170 to adapt its behavior. Lower layer 130 uses control information originating from upper layer 120 and passed through interface 180 to adapt its behavior.

The control interfaces 170 and 180 are distinct from the data or packet interfaces 140 and 150. The term "control information" is used to distinguish information passed through interfaces 170 and 180 from data or packets passed through interfaces 140 and 150. Examples of control information include information describing resources on the local device, application-layer information, and information about neighboring devices. However, many other types of control information are contemplated and intended to be within the scope of this disclosure. In some embodiments, these items of control information are attributes of particular layers.

The example protocol stack 110 of FIG. 1 includes only two layers, adjacent to each other. However, the embodiments described herein apply to inter-layer, or cross-layer, communication in stacks with more than two layers. The embodiments also apply to communication between non-adjacent layers, for example between a media access control (MAC) layer (also known as layer-2) and a transport layer (also known as layer-4).

In the example of FIG. 1, the communication between lower layer 130 and upper layer 120 through IES 160 is symmetric. That is, lower layer 130 receives information originating from upper layer 120, and vice-versa. Furthermore, the embodiments described herein may also be used asymmetrically. That is, there is no requirement that lower layer 130 receives information originating from upper layer 120, even if upper layer 120 receives information originating from lower layer 130.

Figure 2:
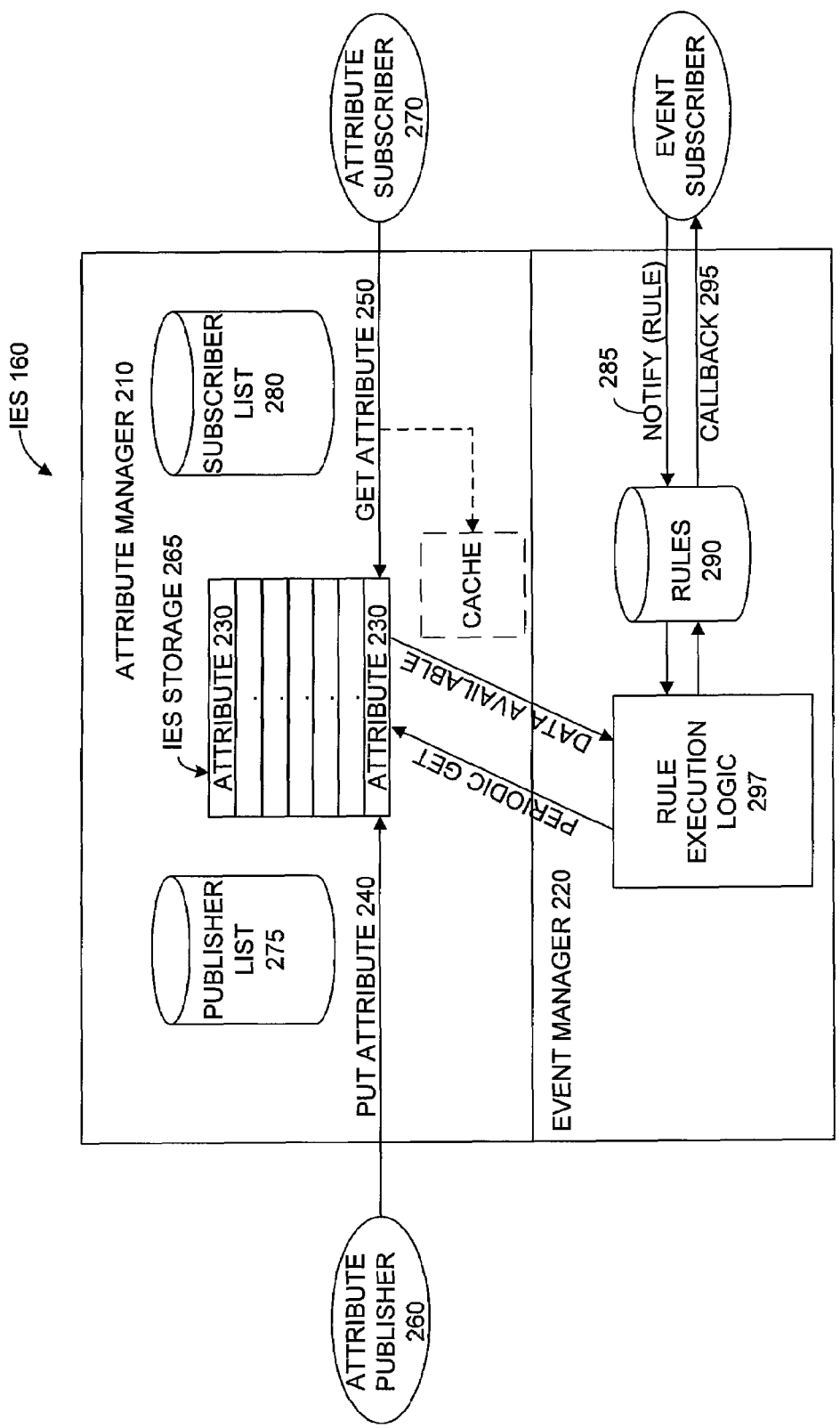
FIG. 2 is a block diagram of one embodiment of the information exchange service (IES) of FIG. 1.

FIG. 2 is a block diagram of one embodiment of the information exchange service (IES) 160 from FIG. 1. In this embodiment, the functionality of IES 160 is decomposed into an attribute manager 210 and an event manager 220. Attribute manager 210 implements sharing of attributes 230 between protocols layer through a PutAttribute interface 240 and a GetAttribute interface 250. One protocol layer, acting as an attribute publisher 260, uses PutAttribute interface 240 to store a particular attribute-value pair in IES 160, for sharing with other layers. On registration, IES 160 writes the attribute-value pair 230 to IES storage 265. Another protocol layer, acting as an attribute subscriber 270, uses GetAttribute interface 250 to retrieve a particular attribute-value pair 230 from IES storage 265. Information identifying publishers and subscribers may optionally be stored by IES 160 in a publisher list 275 and a subscriber list 280.

Event manager 220 notifies protocol layers about changes to attributes 230. A subscriber 270 registers for attribute change notification through notification interface 285. In some embodiments, the notification interface 285 allows subscriber 270 to specify a rule 290, expressed as a condition of an attribute 230 (e.g., "EnergyLevel<5"). Rules 290 are stored by IES 160, and when the condition is met, event manager 220 invokes the registered callback (295) to notify subscriber 270. In some embodiments, rules 290 are processed by rule execution logic 297.

These features in IES 160 provide both stackability and adaptability. Access to attributes 230 is transparent to publishers and subscribers (i.e., publishers are unaware of subscribers and vice-versa). Attributes are extensible: new attributes 230 can be added without a change to the interfaces or to the underlying structure. For example, a new routing protocol can be substituted into protocol stack 110, and that new routing protocol can publish a new attribute 230 that is not presently stored in IES 160.

Having introduced both attribute manager 210 and event manager 220, each will now be described in further detail. In some embodiments, each attribute 230 managed by attribute manager 210 has a unique identifier known to all the layers, and the attribute identifier maps to a unique declarative description of the attribute (e.g., an XML declaration of the attribute). In such embodiments, a protocol layer can obtain an attribute's identifier from the attribute's declaration by contacting an attribute name server (analogous to a DNS lookup for a TCP address).

In some embodiments, the GetAttribute interface 250 provided by attribute manager 210 is synchronous, i.e., the "get" semantic copies the value associated with the attribute (if available), and returns the number of bytes corresponding to the data value (zero indicating that the data is currently unavailable). In some embodiments, GetAttribute interface 250 is asynchronous, i.e., the "get" semantic with a callback. In some asynchronous embodiments, the "get" semantic includes periodicity, so that the "get" callback is called periodically with updates of the attribute's value. In such embodiments, the PutAttribute interface 240 uses a "put" semantic with an expiration parameter, which specifies a time at which the attribute's value is no longer valid. Further details of asynchronous embodiments will be described later in connection with FIG. 3.

As described above, some embodiments of event manager 220 provide rule-based notification. One such embodiment of event manager 220 is implemented by registering itself as a subscriber 270 of attribute manager 210 for the attribute in the specified rule 290. When notified by attribute manager 210 of a change to the attribute value 230 (e.g., through GetAttribute interface 250), event manager 220 checks the condition specified by rule 290, and if the condition is met, notifies the subscribing protocol layer by invoking the registered callback 295.

Some embodiments of attribute manager 210 use a fully-associative cache to store attributes 230. Although the cache may use various replacement policies, a least-recently used cache policy is particularly advantageous in protocol stacks where different layers cooperate to achieve some common goal (e.g., energy optimization) and therefore may query a common attribute from IES (e.g., remaining battery level).

In embodiments in which IES storage 265 is limited or finite, IES 160 may decide to evict, or retire, attributes 230 from storage to make room for more. Examples of an eviction policy include least recently used (LRU) and using a priority associated with each 230. Since in some cases this eviction may occur before any subscriber 270 requests it, some embodiments of IES 160 allow the publisher 260 to tag the data with a sticky bit to override the eviction policy. Alternatively, attribute manager 210 may asynchronously "pull" the data from a publisher upon a request from a subscriber.

A cache implemented by one example attribute manager 210 uses fixed length attribute-value pairs, stored in an array. Each attribute is directly mapped to an entry in a hash table (not shown), where the hash table maps the attribute to an index in the array. Thus, if the attribute is present in the hash table, then its value can be directly accessed from the array. If the attribute is not present in the hash table, then the array is searched. By keeping the set associative, the search space is reduced to the associativity factor. As an example, for a hash table of 8 entries, and a 16-way set-associative data bank of 256 entries, each hash table entry will be 24 bits (16-bit attribute address and 8-bit array index). For a hit in the hash table (a "cache hit"), an attribute is accessible in 2 comparisons (one to hash table, and another to the array). For a miss in the hash table (a "cache miss"), an attribute is accessible in at most 17 comparisons (one to hash table, and at most 16 to the array).

Figure 3:
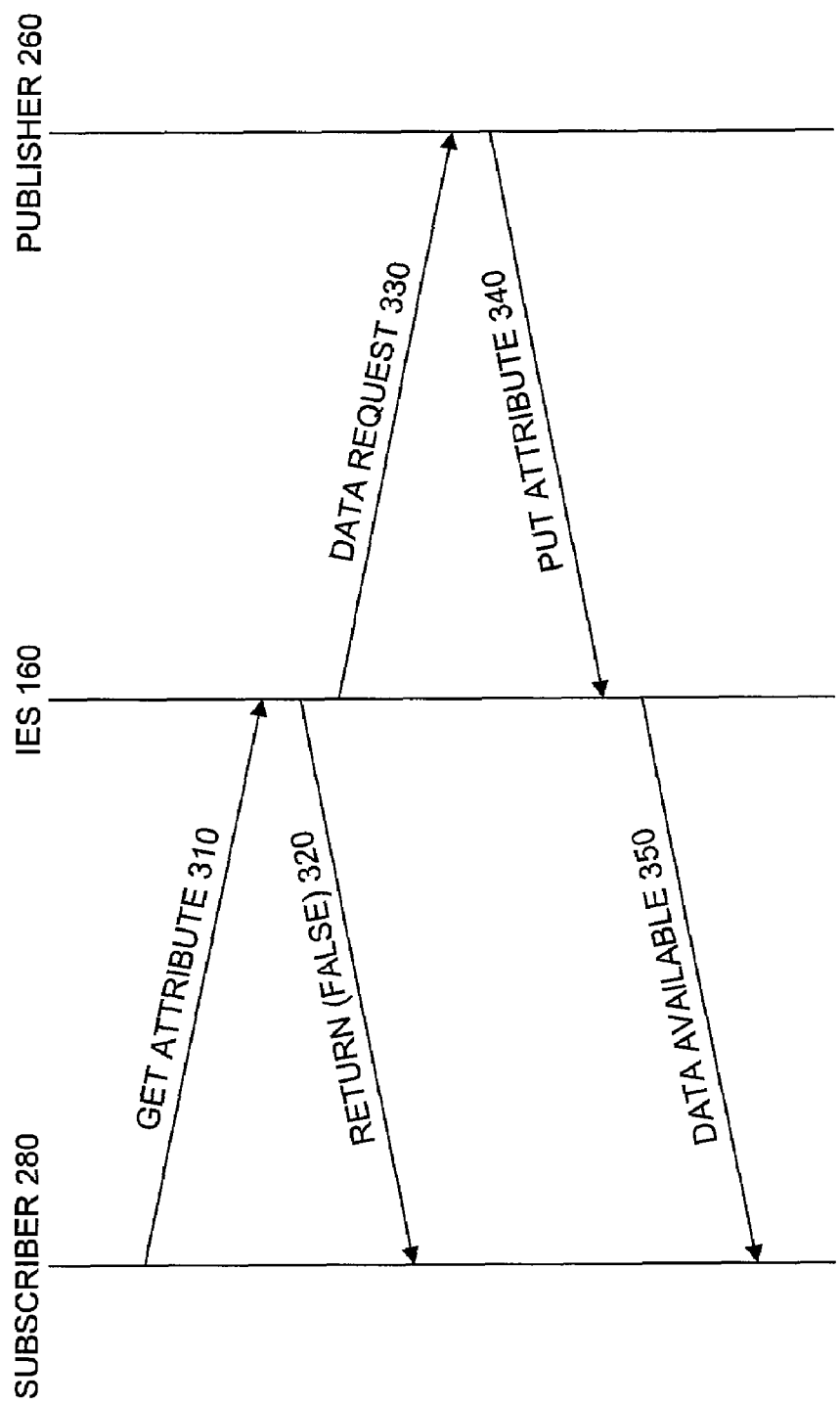
FIG. 3 is a message flow diagram illustrating one embodiment of an asynchronous Get/Put interface implemented by the IES of FIG. 1.

FIG. 3 is a message flow diagram illustrating one embodiment of an asynchronous Get/Put interface implemented by IES 160. The initial GetAttribute request 310 (issued by subscriber 270) initially returns with failure 320 because the requested attribute 230 (in FIG. 2) is not available in IES storage 265 (in FIG. 2). Such a failure 320 may occur when no publisher 260 has put/written the attribute 230, or when the attribute 230 was evicted (possibly as a result of expiration) from IES storage 265.

On failure 320, IES 160 determines if any publisher 260 has registered for the requested attribute 230, and it sends a data request message 330 to the registered publisher 260. At a later time, publisher 260 puts (340) the attribute 230. In response to put 340, IES 160 notifies the registered subscriber 270 using a data available message 350, which includes a pointer to the attribute data. Using the pointer in data available message 350, subscriber 270 accesses the attribute 230 in IES storage 265.

Timing may be such that before the subscriber 270 handles data available message 350, attribute 230 been evicted from IES 160, which renders the data available message 350 void. To prevent attribute 230 from getting evicted before data available message 350 is processed by subscriber 270, IES 160 keeps an eviction time window: a minimum time before which the attribute is guaranteed to be available from IES 160. A subscriber 270 is expected to handle data available message 350 within the time window, or else the subscriber 270 must issue a new GetAttribute request.

Figure 4:
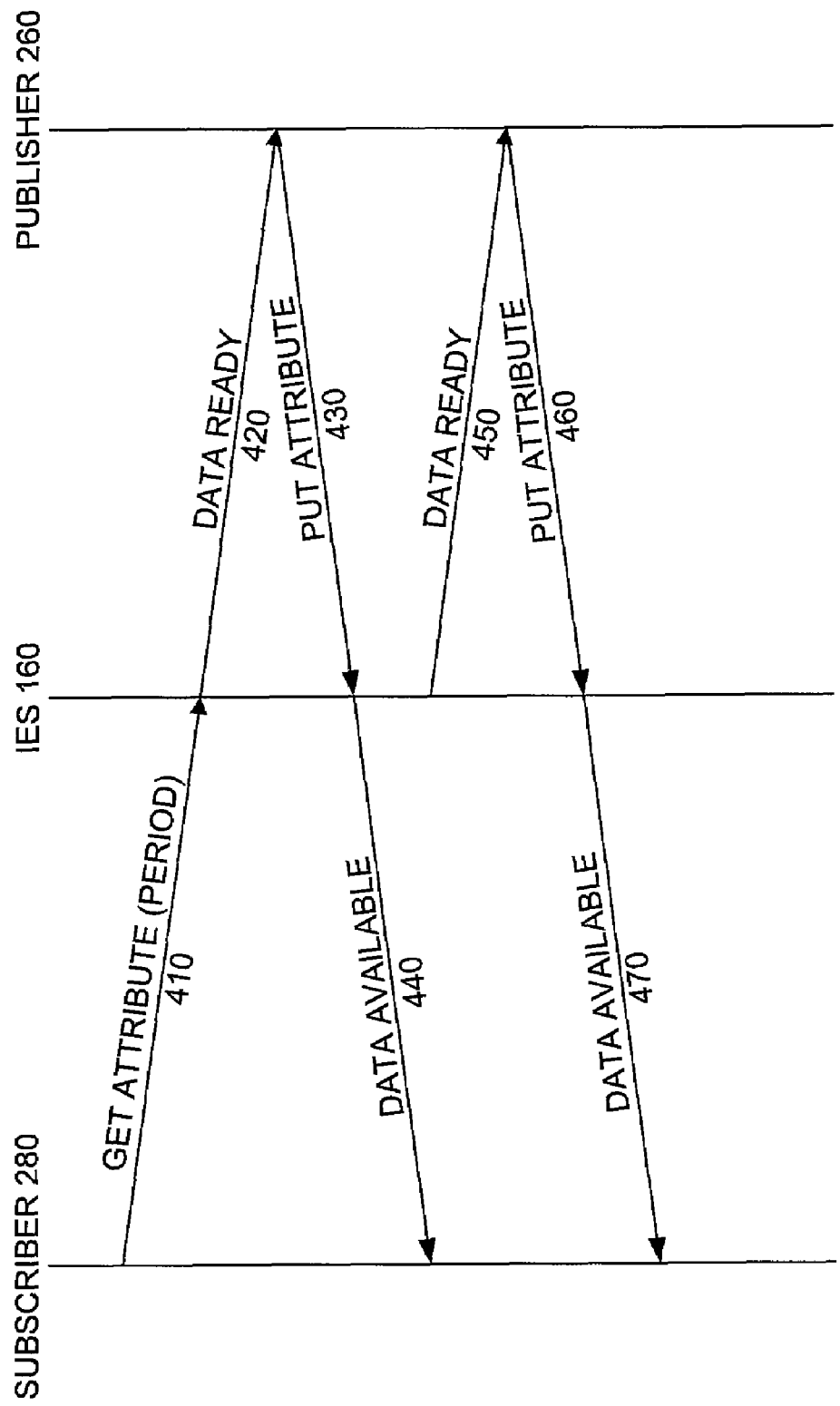
FIG. 4 is a message flow diagram illustrating another embodiment of an asynchronous Get/Put interface implemented by the IES of FIG. 1.

FIG. 4 is a message flow diagram illustrating another embodiment of an asynchronous Get/Put interface implemented by IES 160. Subscriber 270 issues a GetAttribute request 410 using a periodic parameter. In some embodiments, GetAttribute request 410 is non-blocking. In response, IES 160 periodically determines whether if the requested attribute 230 has expired, or is unavailable in IES storage 265. If either condition is true, IES 160 signals publisher 260 with a data ready message 420. Publisher 260 responds by updating the value of attribute 230 with a PutAttribute 430. IES 160 responds by sending a data available message 440 to subscriber 270.

In this example scenario, the requested attribute 230 expires twice, resulting in two data ready messages (420 and 450), which in turn results in two PutAttributes (430 and 460) and two data available messages (440 and 470). IES 160 may use multiple timers to maintain periodicity; because of the asynchronous nature, the periodicity cannot be guaranteed to be accurate, but may instead depend on how fast publishers 260 are able to handle the data ready messages 420.

An Information Dissemination Service

The protocol stack architecture described, in which information is shared across layers in a device, has wide applicability to many different types of protocol stacks. Additional enhancements are now described to share information across nodes. These enhancements have general applicability, but are particularly useful in a wireless sensor network. In addition to the vagaries of the wireless network itself, nodes are often resource-constrained, which can pose additional challenges for the protocol stack. Nodes may join or leave the network to save their individual battery power, or environment conditions may vary which result in dynamic changes to network topology.

Applications running on sensor networks are often to be network-centric, which leads to cooperation among nodes in order to meet application requirements. Thus the modules which implement the different layers of the protocol stack at a given sensor node may need to adapt to changes in node conditions at remote nodes. The Information Dissemination Service described herein supports this by allowing one node to subscribe to remote IESes, and/or to aggregate and share useful information from multiple nodes.

As one example, a sensor fusion application can monitor the health of its neighbor nodes periodically for role assignment decisions. As another example, an energy conscious routing module uses the same information in making routing decisions. Thus, queries for such information may emanate not only from the application level but also from different layers of the sensor protocol stack to remote nodes.

There may be considerable overlap in different queries. Consider two nodes issuing the same query, "which of my 2-hop neighbors have 80% battery level?". If the two nodes are topologically close to each other, then considerable overlap in the results are likely as well. The results may be exactly the same if the two nodes share the same neighborhood. However, if the queries are processed independently in the network it would lead to significant overhead due to the duplication. The Information Dissemination Service (IDS) described herein provides a unified framework for information sharing across nodes.

IDS supports a stream of queries over remote IES data with reduced communication overhead. Two sources of redundant communication in supporting IES across nodes are overlap in the scope of queries executed at different nodes, and rate of queries as compared to rate of change in remote data. IDS uses various techniques to reduce such communication redundancy and to provide IDS support in a scalable and adaptable manner.

The high-level query interface provided by IDS is expressive and allows detection of possible overlap among different queries. A typical query may appear as follows: "select attributes fx; y; zg from all nodes within the scope S satisfying the conditions fp; q; rg, and deliver the results with a periodicity of T."

Queries overlap if and only if the scope of the participating nodes as well as the collected results overlap. Detecting such an overlap helps control flooding of a query, as well as sharing of the results. Overlaps can be full or partial, either in their scope, attributes of the query, and/or the results.

Once a query overlap is detected, the results can be shared to save on the network communication for the results. IDS shares results among queries, where one query subsumes another, both in scope and attributes. IDS also determines if there is a partial overlap among queries, and then executes the partially overlapping queries in the non-overlapping scopes, while reducing or avoiding duplication of results.

IDS supports both region-based and global queries. When a protocol module initiates a region-based query, first a region is created by informing all the neighboring nodes that may lie within the scope. To limit flooding of beacon packets, a region is scoped either in terms of number of hops or physical distance from the initiator node. A beacon packet consists of a region identifier, scope, and a set of predicates. A node receiving a beacon checks if it lies within the scope of the region, and if it does not, it ignores the packet. Otherwise, the node becomes a member of the region and it broadcasts the beacon packet. Thus the beacon packet is propagated as a wave originating from the initiator node and the wave dies beyond the query scope.

If a node satisfies the beacon's predicates, it also acts as a producer node, i.e. it will need to send the query response to the consumer node. In the first embodiment described, the response is sent back periodically. Embodiments described later optimize the response to decrease communication overhead.

An obvious option to disseminate data from the producer nodes to their consumers is to create data diffusion trees, with the consumer nodes at the tree roots. Since there will be as many trees as the queries, supporting data sharing across different trees becomes important as the number of trees grows. However, efficient sharing across different diffusion trees can be difficult, typical solutions incur the overhead of tree maintenance and also disseminating tree attributes continuously, to allow sharing of the tree by other nodes. Because of such overheads, using diffusion trees for control data dissemination becomes inefficient as the number of trees grows.

Another option is to flood the produced data to the whole region. As the number of consumer nodes increase within a region, the overhead of flooding per consumer node decreases, especially when the consumer nodes are subscribed to same control data. Since control data packets are smaller, and they can be piggybacked with each other to be sent as a single packet, even consumers with differing attribute requests help to amortize the flooding cost.

IDS uses both of the above techniques depending on the network conditions. To optimize the communication overhead, flooding is scoped within a query region only. Also, to avoid the broadcast storm problem, IDS controls the rebroadcast probability.

Having discussed regional-based queries, global queries will now be described. In handling global queries, IDS utilizes a support service for location awareness, and uses geographically-scoped queries. In a location-aware sensor network, nearness can be easily captured using physical distance. However, since sensor network links have been found to be asymmetric in nature, physical distance may not be able to capture reliability and hop-count between nodes. Still, location-based querying provides an easy way to express scope, where finding spatial overlap among queries becomes straightforward. Relative coordinates are used for location identification, avoiding the need for extra hardware such as GPS at a node.

Using location-based scoping for queries, the spatial overlap can be easily detected by finding the common areas from the scope. To share the results among overlapping scopes, IDS divides the topology into smaller clusters with a cluster head that knows the membership of the nodes within a cluster. Query-aware hierarchical clustering allows information sharing at the cluster level, thus avoiding the overhead of flooding inside clusters (if the cluster head already has the query results). Some embodiments of use IDS dynamically construction of hierarchical clusters to further optimize queries, perform result aggregation, and result sharing. Some embodiments add result filters that are cognizant of "partial overlap" at cluster heads and/or at strategic nodes in the network.

Some embodiments of IDS support dynamic role migration, where the role played by a cluster head can migrate to other nodes. Cluster heads are the nodes that act as the root of a local aggregation tree. These nodes are responsible for deciding if a query needs to be flooded within a cluster.

Some embodiments of IDS perform cluster formation and cluster head selection using simple location-aware clustering algorithms such as LEACH. The LEACH algorithm gives a two-level cluster hierarchy, with data sources at first level, and cluster-heads at the second level.

Some embodiments of IDS represent a location-based scope of a query as a tuple <x; y>, such that any node in a square region of length x and width y, with respect to the node's current location, becomes the area of interest. In these embodiments, cluster heads, having a cluster-level view of all existing query trees and membership information, participate actively in query optimizations. For example, consider an aggregation tree rooted at a sink node, spanning the entire network. Now, if another sink wishes to build a query aggregation tree, and if the new tree physically overlaps with the earlier one, then within the overlap region, only cluster-heads need to report the results back to the new sink. The non-overlapping regions will be handled using techniques known to a person of ordinary skill in the art.

Some embodiments of IDS build on the DFuse role assignment algorithm to load balance the cluster head role. (This algorithm is described in "Dfuse: a framework for distributed data fusion", by R. Kumar, M. Wolenetz, B. Aganvalla, J. Shin, P. Hutto, A. Paul, and U. Ramachandran, In SenSys '03: Proceedings of the 1st International Conference on Embedded Networked Sensor Systems, which is incorporated by reference.). During the maintenance phase of the DFuse algorithm, every node hosting a particular role is responsible for either continuing to play that role or transferring the role to one of its neighbors. The decision for role transfer is taken solely by the current role player based upon local information. A role player, i.e., a cluster head in IDS, periodically informs its neighbors about its role and its health (an indicator of how good the node is in hosting that role. Upon receiving such a message, a neighboring node computes its own health for hosting that role. If the receiving node determines that it can play the role better than the sender, then it informs the sender its intent for hosting that role. If the sender receives one or more intention requests from its neighbors, the role is transferred to the neighbor with the best health.

Some embodiments of IDS support on-demand clustering by partitioning the network into a static grid, where inter-node distance corresponds to one-hop transmission range. However, because of the inherent dynamic nature of sensor networks, static clustering may not be suitable. Also, quite often only a part of the deployed network may be involved in maintenance activities warranted by IDS (or even application level queries). Creating and maintaining clusters over the entire network may lead to unnecessary control overhead. On-demand clustering reduces such control overhead.

A person of ordinary skill in the art should recognize that the software components illustrated in FIGS. 1-2 are abstractions chosen to illustrate how some embodiments of a system and method for sharing information between protocol layers partition functionality among components. Such a person should also recognize that other divisions of functionality are also possible, and these other possibilities are intended to be within the scope of this disclosure. Furthermore, to the extent that software components in FIGS. 1-2 are described in terms of specific data structures such as arrays, lists, flags, pointers, collections, etc., a person of ordinary skill in the art should appreciate that other data structures providing similar functionality can be used instead. As just one example, a particular implementation might use a linked list instead of an array.

A person of ordinary skill in the art should understand that software components referred to herein include executable code that is packaged, for example, as a standalone executable file, a library, a shared library, a loadable module, a driver, or an assembly, as well as interpreted code that is packaged, for example, as a class. In general, the components used by the systems and methods of sharing information between protocol layers are described herein in terms of code and data, rather than with reference to a particular hardware device executing that code. Furthermore, one of ordinary skill in the art will understand that the systems and methods can be implemented in any programming language, and executed on any hardware platform.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

Figure 5:
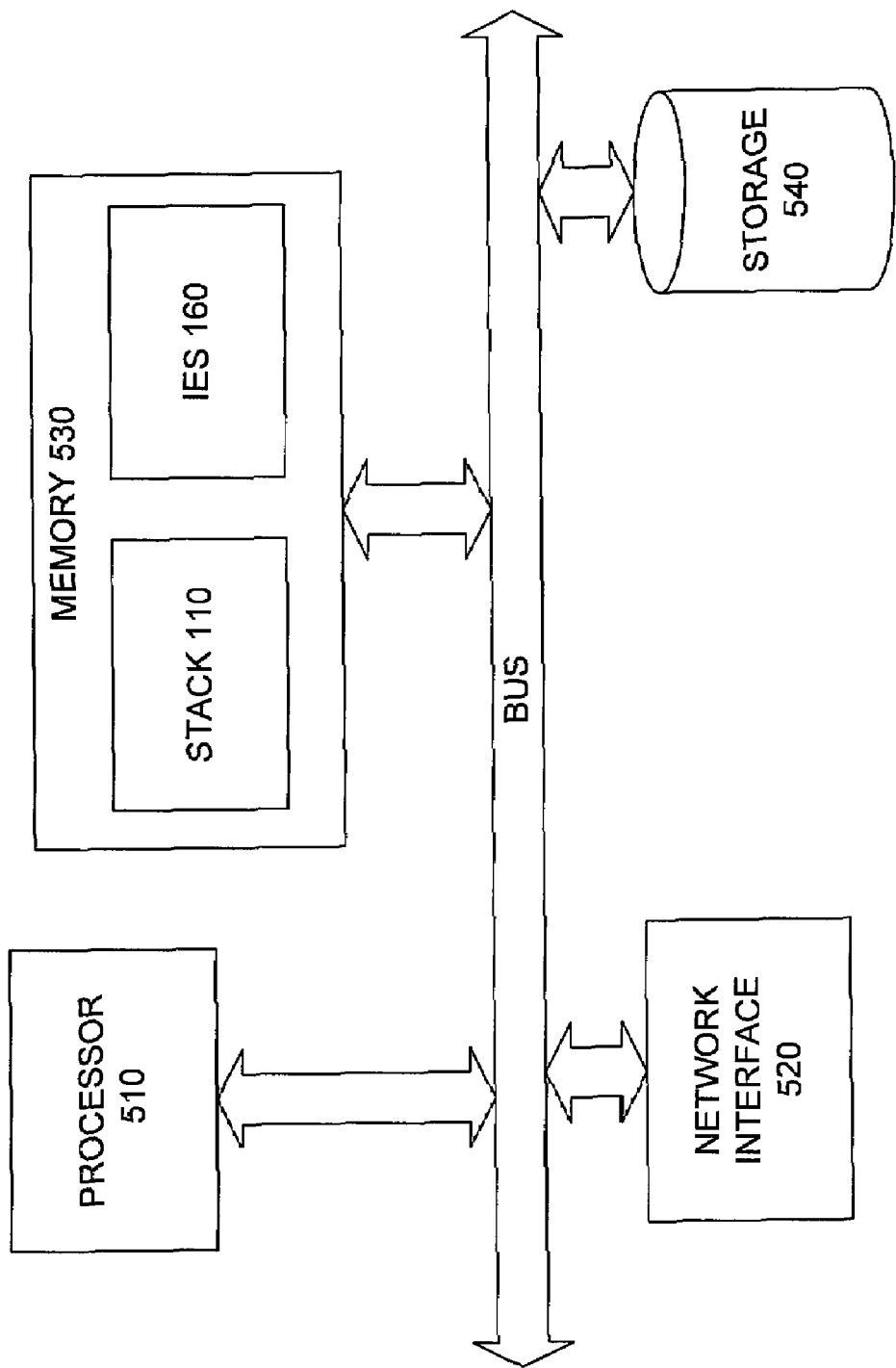
FIG. 5 is a hardware block diagram of a device in accordance with a system and method for sharing information between protocol layers.

FIG. 5 is a hardware block diagram of a device 500 in accordance with a system and method for sharing information between protocol layers. Device 500 contains a number of components that are familiar to a person of ordinary skill in the art, including a processor 510, at least one network interface 520, memory 530, and non-volatile storage 540. A person of ordinary skill in the art should understand that the networks interfaces may be of different types, support different medias and speeds, etc. Examples of non-volatile storage include, for example, a hard disk, flash RAM, flash ROM, EEPROM, etc. These components are coupled via bus 550.

Memory 530 contains instructions which, when executed by the processor 1110, implement the methods and systems disclosed herein. Memory 530 contains protocol stack 110 and information exchange service (IES) 160 from FIG. 1. Omitted from FIG. 5 are a number of conventional components that are not necessary to explain the operation of device 500.

The systems and methods disclosed herein can be implemented in software, hardware, or a combination thereof. In some embodiments, the system and/or method is implemented in software that is stored in a memory and that is executed by a suitable microprocessor, network processor, or microcontroller situated in a computing device. In other embodiments, the system and/or method is implemented in hardware, including, but not limited to, a programmable logic device (PLD), programmable gate array (PGA), field programmable gate array (FPGA) or an application-specific integrated circuit (ASIC).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What we claim is:

1. A device comprising:
    memory; and
    a processor configured by instructions retrieved from the memory to:
    implement a publishing protocol layer, which specifies a control attribute and an associated value to be shared, the control attribute being one of a plurality of attributes;
    implement a subscribing protocol layer; and
    implement an information exchange service, the information exchange service configured to receive the control attribute and the associated value from the publishing protocol layer and to store the control attribute and the associated value in a storage of the device, and further configured to supply the stored associated value to the subscribing protocol layer responsive to a request from the subscribing protocol layer,
    wherein the subscribing protocol layer is configured to adapt behavior based on the stored associated value of the control attribute supplied by the information exchange service.

2. The device of claim 1, wherein the information exchange service is further configured to maintain multiple control attributes and associated values.

3. The device of claim 1, wherein the information exchange service is further configured to periodically provide the associated value to the subscribing protocol layer.

4. The device of claim 1, wherein the information exchange service is further configured to periodically provide the associated value to the subscribing protocol layer and to receive an indication from the publishing protocol layer of an expiration time for the associated value.

5. The device of claim 1, wherein the information exchange service is further configured to receive a rule registration that includes a condition of one of the control attributes, and to notify the subscribing protocol layer when the condition is satisfied.

6. The device of claim 1, wherein the information exchange service is further configured to evict the control attribute from the storage when the storage is full.

7. The device of claim 6, wherein the information exchange service is further configured to apply a least-recently-used policy for eviction.

8. The device of claim 2, wherein the information exchange service is further configured to select one of the control attributes for eviction based on a sticky bit associated with the corresponding attribute.

9. The device of claim 2, wherein the information exchange service is further configured to communicate with a peer information exchange service in another device, and to handle multiple queries from the peer for one of the control attributes.

10. The device of claim 9, wherein the information exchange service is further configured to determine if overlap exists among the multiple queries and if overlap does exist, to share a result of the overlapping queries.

11. A method for using an exchange intermediary to communicate between a publishing layer and a subscribing layer in a protocol stack residing in a computing device, the method comprising the steps of:
    the publishing layer in the computing device specifying, to the exchange intermediary, an attribute and an associated value to be shared with a layer in the protocol stack, the attribute being one of a plurality of attributes;
    the subscribing layer in the computing device adapting behavior based on the attribute;
    the exchange intermediary implemented by a processor in the computing device storing the specified attribute and the associated value;
    the exchange intermediary implemented by the processor in the computing device receiving a subscribe request, from the subscribing layer, specifying the published attribute; and
    the exchange intermediary implemented by the processor in the computing device providing the associated value of the published attribute to the subscribing layer in response to the subscribe request.

12. The method of claim 11, further comprising the step of: storing multiple attributes and associated values, described by an XML-based description.

13. The method of claim 11, further comprising the step of periodically providing the associated value of the published attribute to the subscribing protocol layer.

14. The method of claim 11, further comprising the step of:
    receiving an indication from the publishing layer of an expiration time for the associated value of the attribute to be shared.

15. The method of claim 11, further comprising the steps of:
    receiving a rule registration that includes a condition of the attribute; and notifying the subscribing protocol layer when the condition is satisfied.

16. The method of claim 11, further comprising the steps of:

storing multiple attributes and associated values in a storage within the computing device, responsive to respective publication requests from the publishing layer; and evicting a selected one of the attributes from the storage when the storage is full.

17. The method of claim 11, further comprising the steps of:

communicating with a peer information exchange service in another computing device; and receiving multiple queries from the peer information exchange service for one of the attributes.

18. The method of claim 11, further comprising the steps determining if overlap exists among the multiple queries; and if overlap does exist, sharing a result of the overlapping queries.

19. The method of claim 11, further comprising the steps of:

storing multiple attributes and associated values, responsive to respective publication requests from the publishing layer; and selecting one of the attributes for eviction based on a sticky bit associated with the corresponding attribute.

* * * * *